(12) United States Patent
Brough

(10) Patent No.: US 9,946,622 B2
(45) Date of Patent: Apr. 17, 2018

(54) MOBILE DEVICE APPLICATION MONITORING SOFTWARE

(71) Applicant: Michael Brough, Aliso Viejo, CA (US)

(72) Inventor: Michael Brough, Aliso Viejo, CA (US)

(*) Notice: Subject to any disclaimer, the term of this patent is extended or adjusted under 35 U.S.C. 154(b) by 0 days.

(21) Appl. No.: 14/305,726

(22) Filed: Jun. 16, 2014

(65) Prior Publication Data

US 2015/0363289 A1 Dec. 17, 2015

(51) Int. Cl.
*G06F 15/16* (2006.01)
*G06F 11/30* (2006.01)
*H04W 24/10* (2009.01)
*H04W 4/00* (2018.01)
*G06F 11/34* (2006.01)
*H04L 12/26* (2006.01)

(52) U.S. Cl.
CPC ........ *G06F 11/302* (2013.01); *G06F 11/3438* (2013.01); *H04L 43/16* (2013.01); *H04W 4/003* (2013.01); *H04W 24/10* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 8,935,393 | B1* | 1/2015 | Jackson | H04L 43/04 709/224 |
| 9,195,721 | B2* | 11/2015 | Soto Matamala | G06F 17/3089 |
| 2008/0270561 | A1* | 10/2008 | Tang | G06Q 30/02 709/207 |
| 2009/0106304 | A1* | 4/2009 | Song | G06K 9/6222 |
| 2009/0106314 | A1* | 4/2009 | Song | G06K 9/6221 |
| 2011/0225291 | A1* | 9/2011 | Dobroth | G06Q 10/10 709/224 |
| 2012/0254246 | A1* | 10/2012 | Kerger | H04W 4/206 707/780 |
| 2012/0316955 | A1* | 12/2012 | Panguluri | G06Q 30/02 705/14.41 |
| 2013/0014040 | A1* | 1/2013 | Jagannathan | G06Q 50/01 715/765 |
| 2013/0132896 | A1* | 5/2013 | Lee | G06Q 10/10 715/808 |
| 2013/0232256 | A1* | 9/2013 | Lee | H04W 4/003 709/224 |
| 2013/0290369 | A1* | 10/2013 | Sayers | H04L 67/22 707/769 |
| 2013/0325856 | A1* | 12/2013 | Soto Matamala | G06F 17/3089 707/724 |
| 2014/0006517 | A1* | 1/2014 | Hsiao | G06Q 50/01 709/205 |
| 2014/0279787 | A1* | 9/2014 | Cheng | G06F 8/60 706/46 |
| 2015/0058679 | A1* | 2/2015 | Jackson | G06F 11/3433 714/47.2 |
| 2015/0133076 | A1* | 5/2015 | Brough | H04W 24/10 455/405 |

* cited by examiner

*Primary Examiner* — Alicia Baturay
(74) *Attorney, Agent, or Firm* — Eric B. Alspaugh

(57) ABSTRACT

A software application for monitoring the performance of other software applications on mobile devices using efficient crowd sourced data and recommending third party software apps based on a user's demographics and mobile device data.

16 Claims, 14 Drawing Sheets

MOBILE DEVICE APPLICATION MONITORING SOFTWARE

CROSS-REFERENCE TO RELATED APPLICATIONS

Claiming priority to U.S. patent application Ser. No. 14/078,518 dated Nov. 12, 2013 entitled "A mobile device application monitoring software" and claiming priority to provisional application No. 61/724,993 dated Nov. 11, 2012 entitled "M2AppMonitor—A Mobile Application Monitoring System enabling device users, IT Managers or Wireless Carriers to monitor Performance, Quality, Access Rights and Usage of Apps" and claiming priority to U.S. provisional application No. 61/816,183 dated Apr. 26, 2013 entitled "A Mobile Device application software monitoring and quick alert system" the contents of which are hereby incorporated by reference.

BACKGROUND

The present invention relates to mobile phone applications and methods of use thereof. In particular, the invention relates to a software system for monitoring and reporting upon the performance of mobile phone applications. The most novel element of this invention is the crowd-source dynamic feedback mechanism which pushes all of the app quality and performance data to the cloud based servers for analysis and then pushes aggregated crowd-source statistics, flagged app alerts and recommendations down to the consumer based on their specific applications, operating system version, device and wireless carrier network they are on.

A significant fraction of mobile phone applications (hereinafter referred to as "apps") are not efficient, optimized, or safe for mobile device performance and for the quality of a consumer's user experience. A leading cause of this problem is that a vast majority of apps in the iPhone and Android markets are designed and coded by hobbyists or other programming amateurs who do not employ sufficient quality controls. To further the problem in the Android market there are over 10,000 different device types on over 300 carrier networks, each of which performs differently. The largest Android app market, the Google Play Store, is growing at an enormous rate of approximately 1000 new apps added into the market every day. The market for iPhone apps is experiencing similar growth. The vast majority of app developers do not have the capability to properly test their apps to work on all of the different devices and carrier networks.

Flagged apps are those that are poorly designed, poorly optimized, poorly quality tested, and/or unsafe, cause consumer frustration and result in device returns for Wireless Carriers and Device OEMs. The problem of flagged apps concerns performance and quality. Additional examples of flagged apps would be malware or viruses infecting apps. Sophisticated mobile phone users deal with flagged apps by downloading 10 or more app performance and quality monitoring tools. These existing app monitoring tools enable sophisticated users to track their applications across essential performance and quality metrics. M2AppMonitor is designed to provide a complete solution, eliminating the need for users to download and install multiple applications. More importantly, the M2AppMonitor data that is gathered, is pushed to the cloud on a timed basis, integrated with data from other M2AppMonitor users and then crowd-sourced statistics, app recommendations and flagged app alerts are pushed to the consumers based on their applications, operating system version, device type and carrier network.

There has been a tremendous push in technology and big data statistical analysis to infer a user's profile and demographics from the user's smartphone behavior. This analysis can identify specific company products and target marketing in a stealthy manner. For example, U.S. Pat. No. 8,631,122 issued to Kadam, et. al. ("Kadam") discloses a method of determining demographics based on user interactions. Kadam relies on reviewing social media and scraping together data from "likes" and other relational behavior to analyze and make predictive product marketing information. While it is possible to make relatively accurate assumptions about a user's demographics it does not require any guess work if the software application just makes the demographics data entry available for a user to enter voluntarily. And, the computing power, overall energy consumption is reduced, and there is a lower likelihood of errors because there is no guessing at the user's profile. Also, in U.S. patent publication number US2010/0203876 filed by Krishnaswamy discloses a method of inferring user profile properties based upon mobile device usage. Again, similar principles are used to guess at a user's profile. Thus, there is a need to reduce power consumption and increase predictive matching based on demographics.

The present invention reduces the power consumption and inaccuracies of guessing at a smart phone user's profile and demographics. In a preferred embodiment a user may provide their profile and demographics directly into the M2AppMonitor. Based on the user profile and demographics the M2AppMonitor cloud based servers will recommend software apps based upon the user's profile. For example, age and sex are important for targeting specific markets such as video games for young males or contraception for young women. Based on crowd source information from other users it will be possible to identify users that are likely to adopt or purchase suggested software apps for the user's specific smart device.

The above referenced patents and patent applications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

SUMMARY OF THE INVENTION

The invention provides a mobile device application software monitoring and quick-alert system that measures quality and performance of applications across a wide range of metrics and enables users to flag and then force-stop or uninstall poorly performing apps.

Additionally, the M2AppMonitor enables the average consumer to monitor the 10 key app performance and quality metrics in one application. The invention makes this possible by first collecting data on all 10 performance parameters and then alerting the user if there are resource overages or abnormal results on those 10 criteria. The M2AppMonitor app on the device sends the app quality and performance data gathered on the device to the M2AppMonitor Cloud Based Servers for analysis. In the cloud, the data is compared and apps are sorted by app type in to categories such as games, utilities or multi-media apps. Then norms are created for each monitoring criteria for each app category. Then, the app's performance data is compared to the criteria norms for the app's respective app category. If the app's resource usage greatly exceeds the category's norm, the M2AppMonitor user will be alerted of the app's high resource usage. Further, the software can have the feature of segmenting this data by device type, operating system version, and carrier network. This is critical because apps run differently on powerful devices and carrier networks versus devices which have low memory, cpu, storage or bandwidth availability. The M2AppMonitor database pushes the norms and alert levels down to the M2AppMonitor users and provides alerts and app recommendations for the various categories of apps based on the crowd-source metrics gathered. Based on the crowd-source metrics gathered, M2AppMonitor would then send alerts to M2AppMonitor users on apps that may run inefficiently on the user's device. Also based on the crowd-source metrics gathered, M2AppMonitor would send recommendations to M2AppMonitor users on apps that run efficiently on the user's device. This is greatly beneficial to the user because M2AppMonitor will receive alerts that are tailored to their specific device. In the event the invention determines an app is functioning poorly it alerts users to these problems as they are happening on the device using a simple notification screen. The invention further gives users a pathway to either force-stop or uninstall flagged apps.

The overall sequence of operation of the app is first the app identifies each and every app installed on the device. Second the app reads the application resource usage for each app on the following list of parameters: battery usage wherein flagged apps require disproportionately more battery drain; wireless data usage wherein flagged apps require disproportionately greater bandwidth; memory usage wherein a flagged app will use a disproportionately large amount of device memory; CPU usage wherein a flagged app will use disproportionately more CPU time; storage usage wherein flagged apps use disproportionately more device storage; permissions wherein flagged apps require an unreasonably high number of permissions as well as relatively more invasive permissions; crashes wherein flagged apps crash more often; notification wherein flagged apps send unimportant or excessive notifications to the user; analytics wherein flagged apps have a disproportionately high number of analytic agents installed; and updates wherein flagged apps update frequently for non-essential matters. Third, after collecting data on all of these parameters, M2AppMonitor compares the application's data to crowd-sourced data. Applications with usage above the 95th percentile are flagged for high resource usage. Multiple methods and statistical tools could be used to compare usage data between apps within given usage categories. For example in a preferred embodiment the 95th percentile is used as a cutoff point to determine which apps should be flagged in a given category. When the app in question exceeds the 95th percentile threshold in usage terms then it will be flagged. In yet a further embodiment, users will have an option to adjust the threshold for each monitored parameter after which the app will be flagged. Finally, the scoring information is output to the M2AppMonitor where the user can view and asses the performance of apps installed on the user's device.

Additionally, the M2AppMonitor is a single interface that allows users to see how their installed apps are affecting their device's health and performance. From the M2AppMonitor, the user can not only either force-stop or uninstall flagged apps but may also filter the display of apps by any of the 10 performance metrics. The M2AppMonitor will continuously monitor applications running on a user's device in the background, even while the user is using other apps or functions on the mobile device.

Additionally, a user may provide their profile and demographics. Based on the user profile and demographics the M2AppMonitor cloud based servers will recommend software apps based upon the user's profile and demographics. For example, age and sex are important for targeting specific markets such as video games for young males or contraception for young women. Based on crowd source information from other users it will be possible to identify users that are likely to adopt or purchase suggested software apps for the user's specific smart device.

In view of the shortcomings of the prior art, it is the object of this invention to provide a mobile device application software monitoring and quick-alert system that targets a user's profile and demographics to improve targeted marketing or suggest additional software apps. Further objects and advantages of the invention will become apparent to those skilled in the art upon reading and consideration of the following description of a preferred embodiment and the accompanying drawings.

DETAILED DESCRIPTION OF THE EMBODIMENTS

Figure 1:
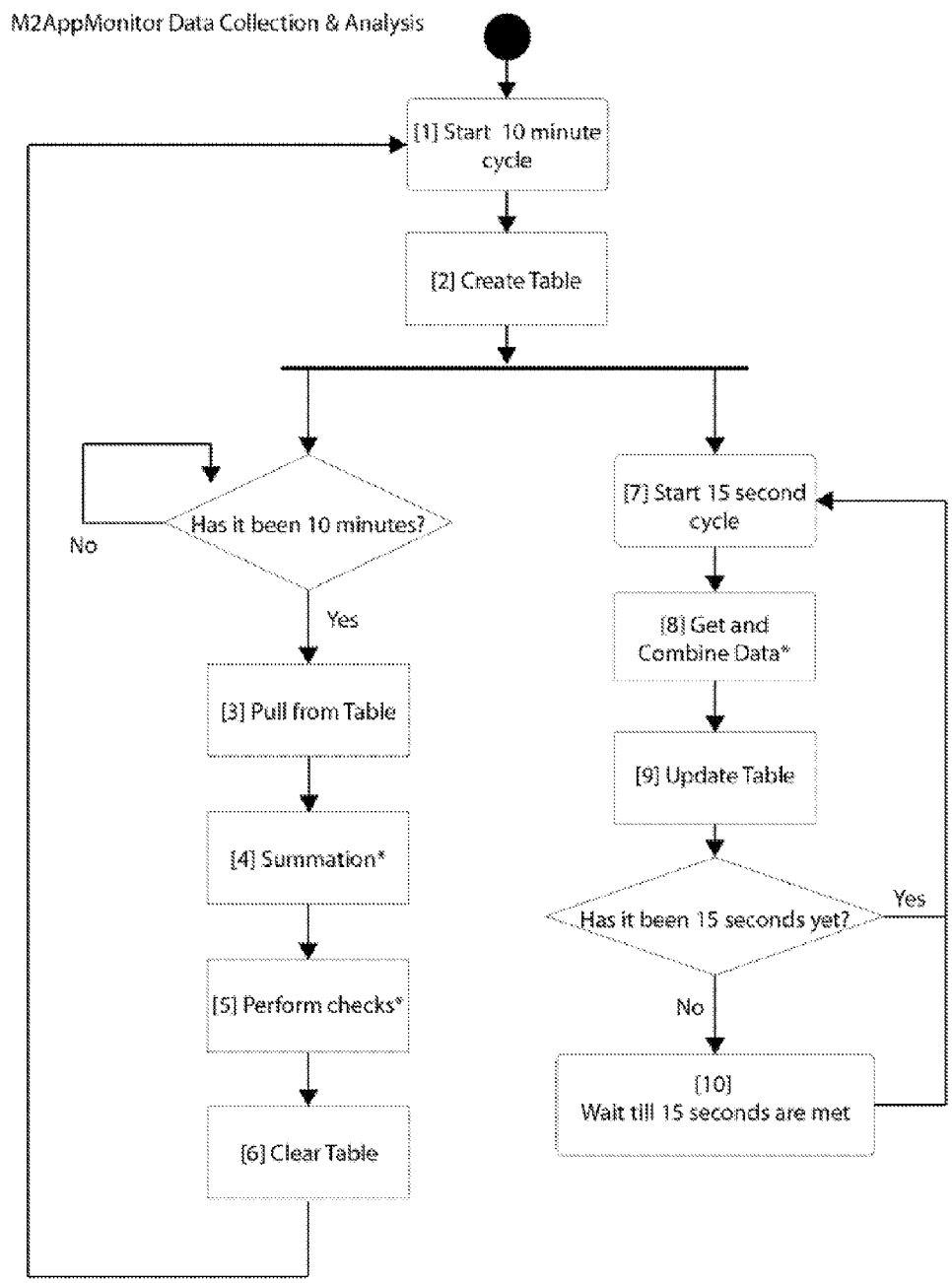
FIG. 1 is a flow diagram showing the two timed operations that are employed for populating the table and assessing application performance.
Figure 2:
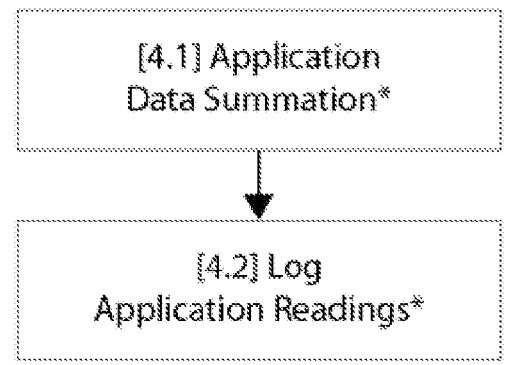
FIG. 2 is a flow diagram of the method for summation.
Figure 3:
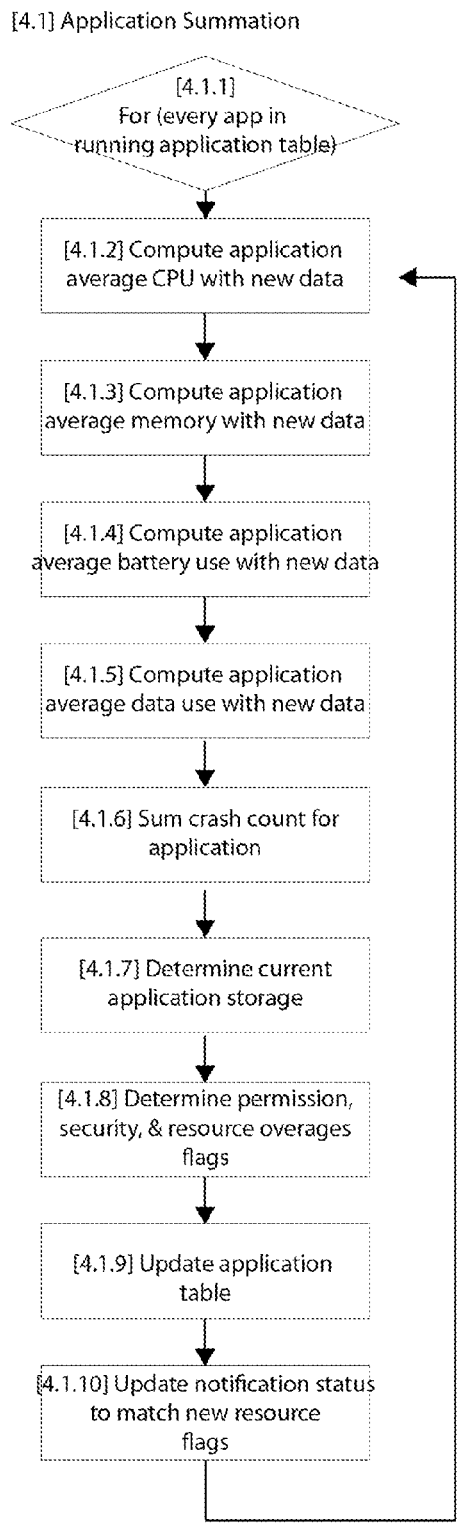
FIG. 3 is a flow diagram of the method for Application Summation.
Figure 4:
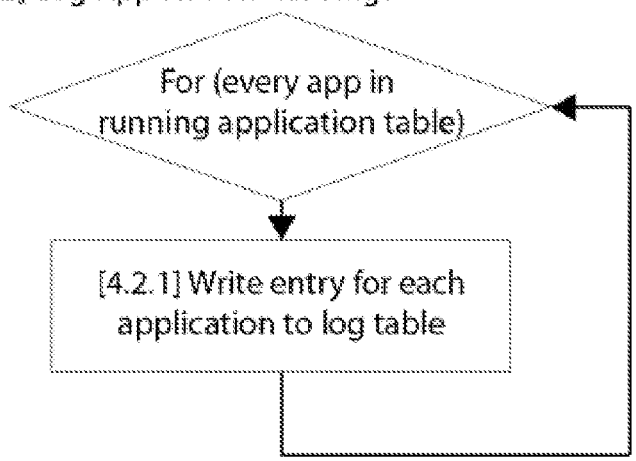
FIG. 4 is a flow diagram of the Logging of Application Readings.
Figure 5:
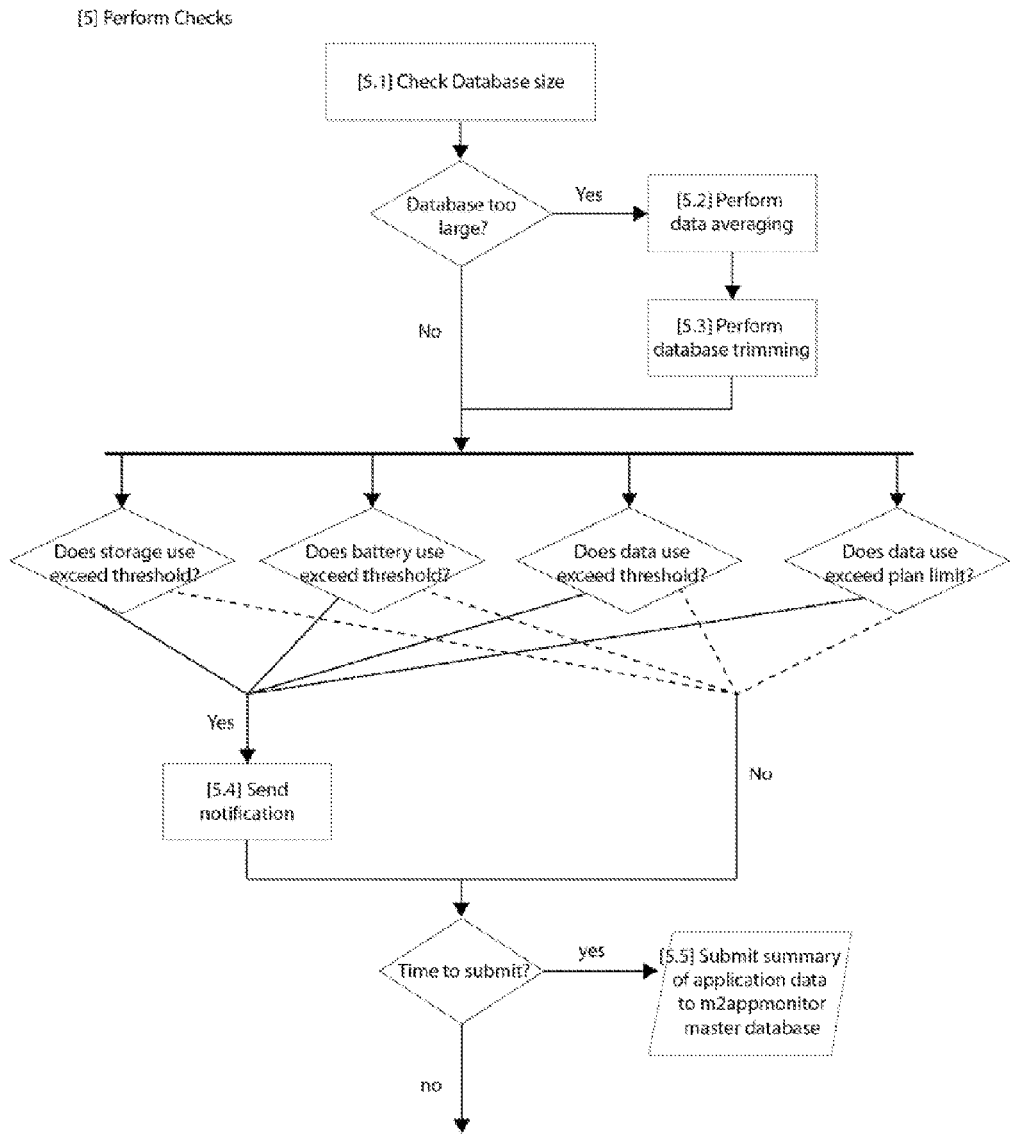
FIG. 5 is a flow diagram of the method for Performing Checks.
Figure 6:
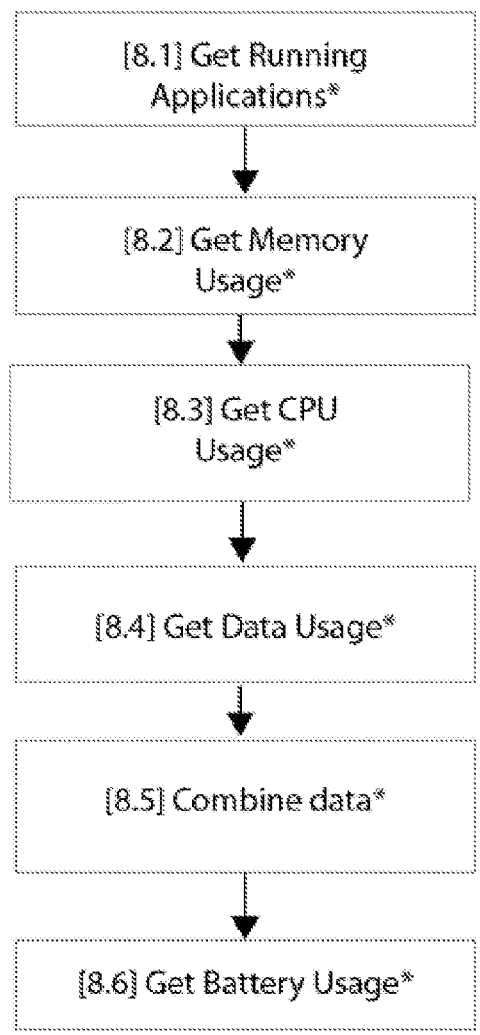
FIG. 6 is a flow diagram of the method for Get and Combine Data.
Figure 7:
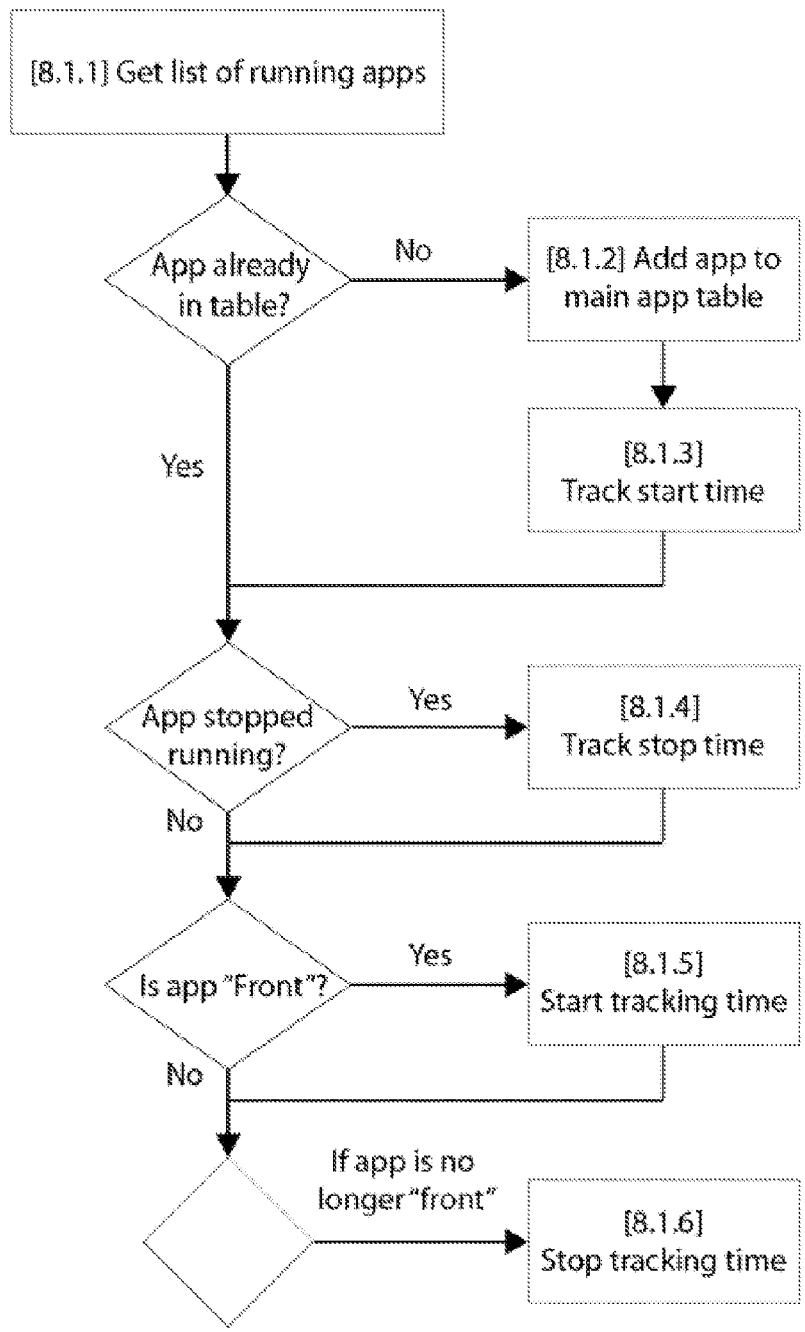
FIG. 7 is a flow diagram of the method for Get Running Applications.
Figure 8:
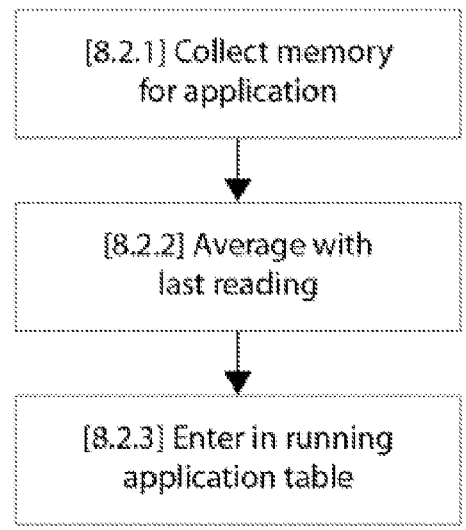
FIG. 8 is a flow diagram of the method for Get Memory Information.
Figure 9:
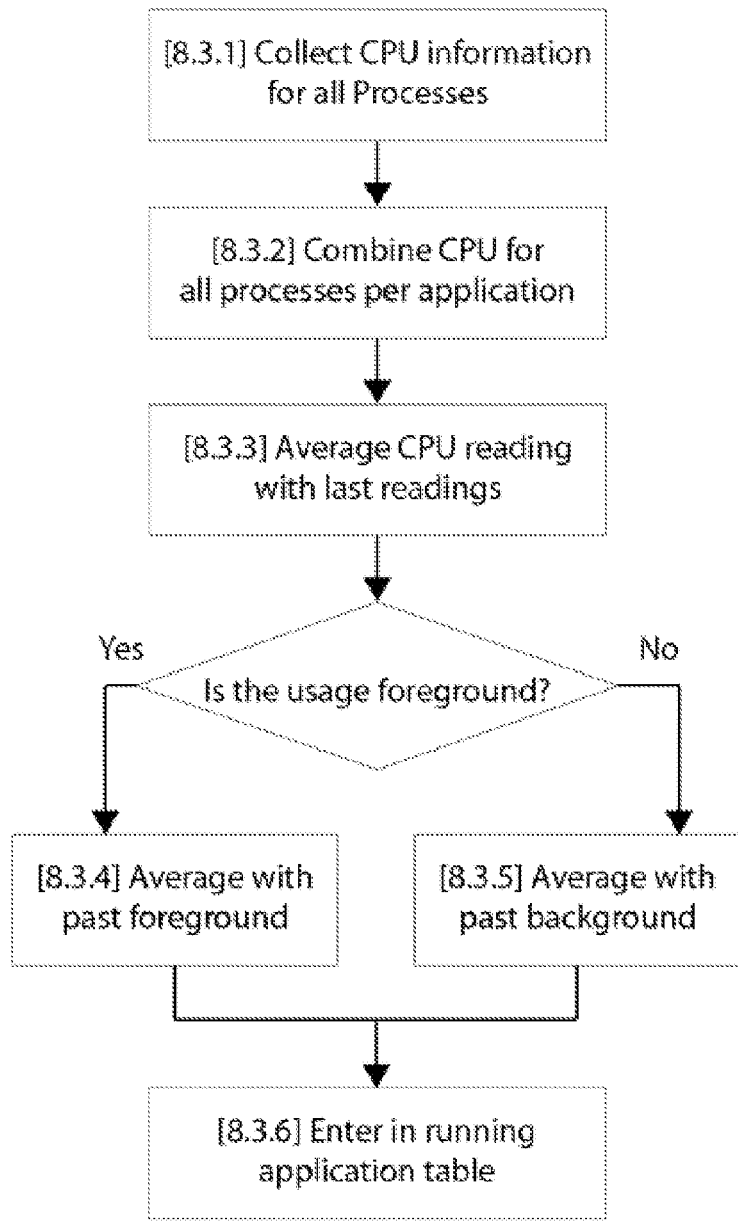
FIG. 9 is a flow diagram of the method for Get CPU Information.
Figure 10:
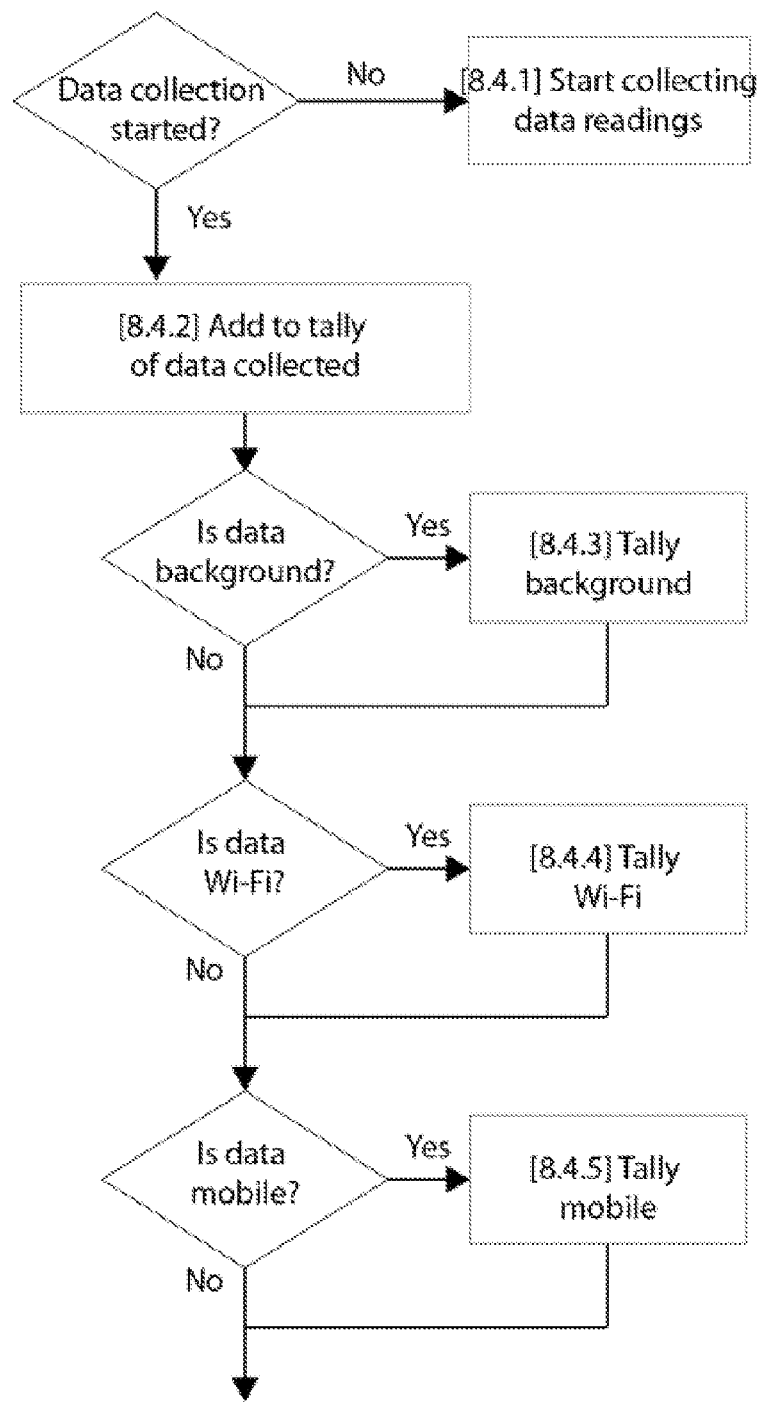
FIG. 10 is a flow diagram of the method for Get Data Usage.
Figure 11:
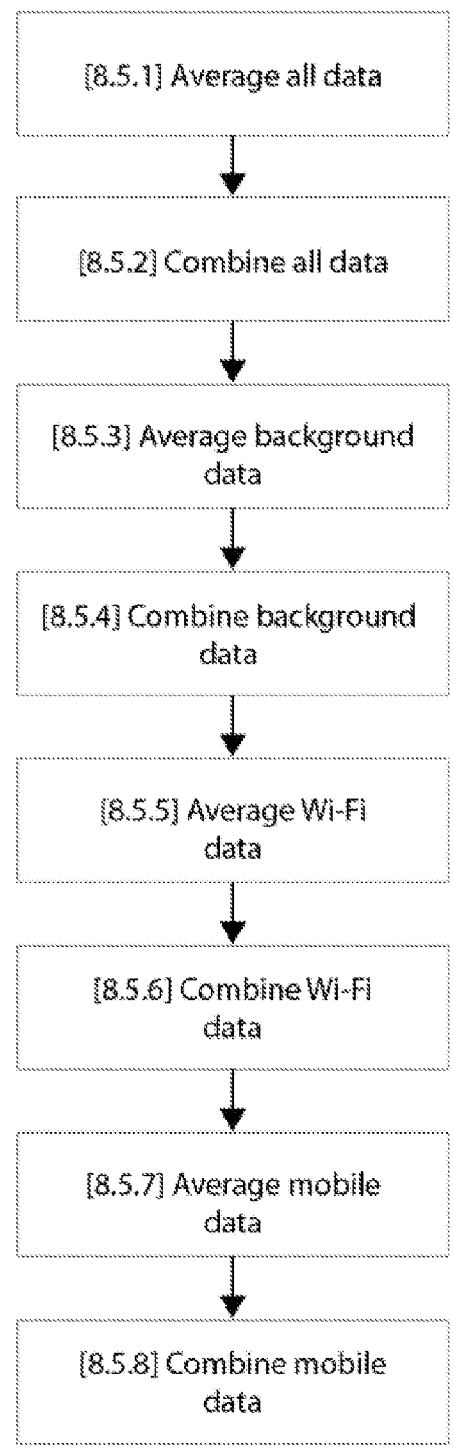
FIG. 11 is a flow diagram of the method for Combine Data.
Figure 12:
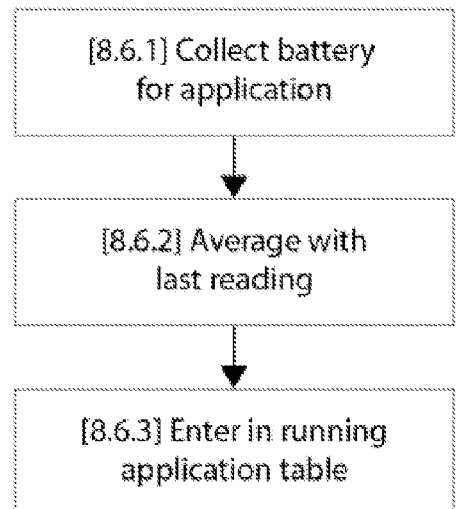
FIG. 12 is a flow diagram of the method for Get Battery Usage.

Referring now to the drawings wherein the showings are for purposes of illustrating a preferred embodiment of the present invention and not for purposes of limiting the same, FIGS. 1-12 show the method of collecting data on, and assessing each application. FIG. 1 is a flow diagram showing the two timed operations that are employed for populating the table and assessing application performance. The process begins by initiating a ten minute cycle, followed by the creation of an application table in memory for storing the data. After the application table is created and the ten minute clock is initiated, a fifteen-second cycle runs forty times repeatedly. Upon initiation of each 15 second cycle. Step 1 is to start a timer that will raise a flag at the 10 minute mark.

This timer restarts approximately every ten minutes after the data table is cleared. Step 2 is to create a table in memory to store information on currently running applications. Step 3 is to pull the data collected in the table every ten minutes. Step 4 is Summation, which is a series of processes that run computations on the collected data.

Step 4.1 is Application Summation which is a series of processes that run computations on the collected data. Step 4.1.1 is to repeat the Application Summation for every app in the active application table. Step 4.1.2 is to compute the application latest average CPU usage with new data. Step 4.1.3 is to compute the application latest average memory usage with new data. Step 4.1.4 is to compute the latest application average battery use with new data. Step 4.1.5 comprises computing the application average as to data usage. Step 4.1.6 comprises summing the number of times an app has crashed during this monitoring cycle. Step 4.1.7 is to determine current application storage. Step 4.1.8 is to determine permission, security, and resource overages. Step 4.1.9 is to update the application table with all the newly computed data. Step 4.1.10 is to update notification status to match the new resource flags to be displayed in the app and status bar.

Step 4.2 is to log the current application readings. Step 4.2.1 is to write an entry for each application and then push the app data to the log table.

Step 5 is Perform Checks, which comprises a series of processes that analyze the collected data to determine whether it is necessary for M2AppMonitor to take any outward action. Step 5.1 is to check the database size. Step 5.2 is to Perform data averaging and then trimming the database. Step 5.3 is to Perform database trimming in the event it is too large. Next, check for four different Extreme Notifications: does storage exceed threshold, does battery exceed threshold, does data use exceed threshold, does data use exceed plan limit. Step 5.4 is to Send Notification when there are flagged apps or Extreme Notifications to report. Step 5.5 is to check if it is time to submit data to the master database. If it is time, the app will submit summary of application data to M2AppMonitor master database.

Step 6 is to clear the table in preparation for the next cycle. Step 7 is to start a 15 second cycle where a flag is raised at the 15 second mark, indicating the start of running application data collection.

Step 8 is to Get and Combine the data, comprising a series of processes that collect and organize data about the applications.

Step 8.1 is to Get Running Applications, comprising a series of steps that obtains information about the running applications. Step 8.1.1 is to Get a list of running applications. Step 8.1.2 is to Add each app to the main app table if it is not yet in the table. Step 8.1.3 is to Track the start time of the newly added app. Step 8.1.4 is to Track stop time, where in the event an app has stopped running its stop time is tracked. Step 8.1.5 is Start tracking time for an app that is a "front" app. Step 8.1.6 is Stop tracking time if an app is no longer a "front" app.

Step 8.2 is to Get memory information, comprising a series of processes that obtain data about memory usage. Step 8.2.1 is to Collect memory for application comprising obtaining app memory usage. Step 8.2.2 is Average with last reading comprising averaging collected memory data with previous data. Step 8.2.3 is Enter in running application table, comprising pushing memory data to the table.

8.3 is to get CPU information comprising a series of processes that obtain data about CPU usage. Step 8.3.1 is to collect CPU information for processes. Step 8.3.2 is to Combine CPU for all processes per application comprising organizing CPU data per application. Step 8.3.3 is Average CPU reading with last readings comprising averaging collected CPU data with previous data. Step 8.3.4 is to average foreground usage with past foreground usage. Step 8.3.5 is to average background usage with past background usage. Step 8.3.6 is to enter in running application table, comprising pushing the CPU data to the table.

Step 8.4 is to get the Data usage comprising a series of processes that obtain data about Data usage. Step 8.4.1 is to Start collecting data readings comprising if data usage has not been collected for the app. Step 8.4.2 is to Add to tally of data collected, comprising if data usage has already been collected for the app then update the current information. Step 8.4.3 is to tally background data usage. Step 8.4.4 is totally Wi-Fi data usage. Step 8.4.5 is totally mobile data usage.

Step 8.5 is to Combine data comprising a series of processes that organizes the collected data. Step 8.5.1 is Average Data, comprising averaging all of the collected data. Step 8.5.2 is Combine data comprising organizing and combining all collected data. Step 8.5.3 is to average background data. Step 8.5.4 is to combine background data. Step 8.5.5 is to average Wi-Fi data. Step 8.5.6 is to combine Wi-Fi data. Step 8.5.7 is to average mobile data. Step 8.5.8 is to combine mobile data.

Step 8.6 is to Get battery usage comprising a series of processes that obtain data about battery usage. Step 8.6.1 is to Collect battery usage for application comprising obtaining app battery usage. Step 8.6.2 is Average with last reading comprising averaging collected battery data with previous data. Step 8.6.3 is Enter in running application table, comprising pushing battery data to the table. Step 9 is to Update the Table with the latest collected data. Step 10 is to Wait until 15 second are met, comprising the data collection process is repeated every 15 seconds, and if the process ends early due to faster hardware, the software still waits 15 seconds before restarting.

Figure 13:
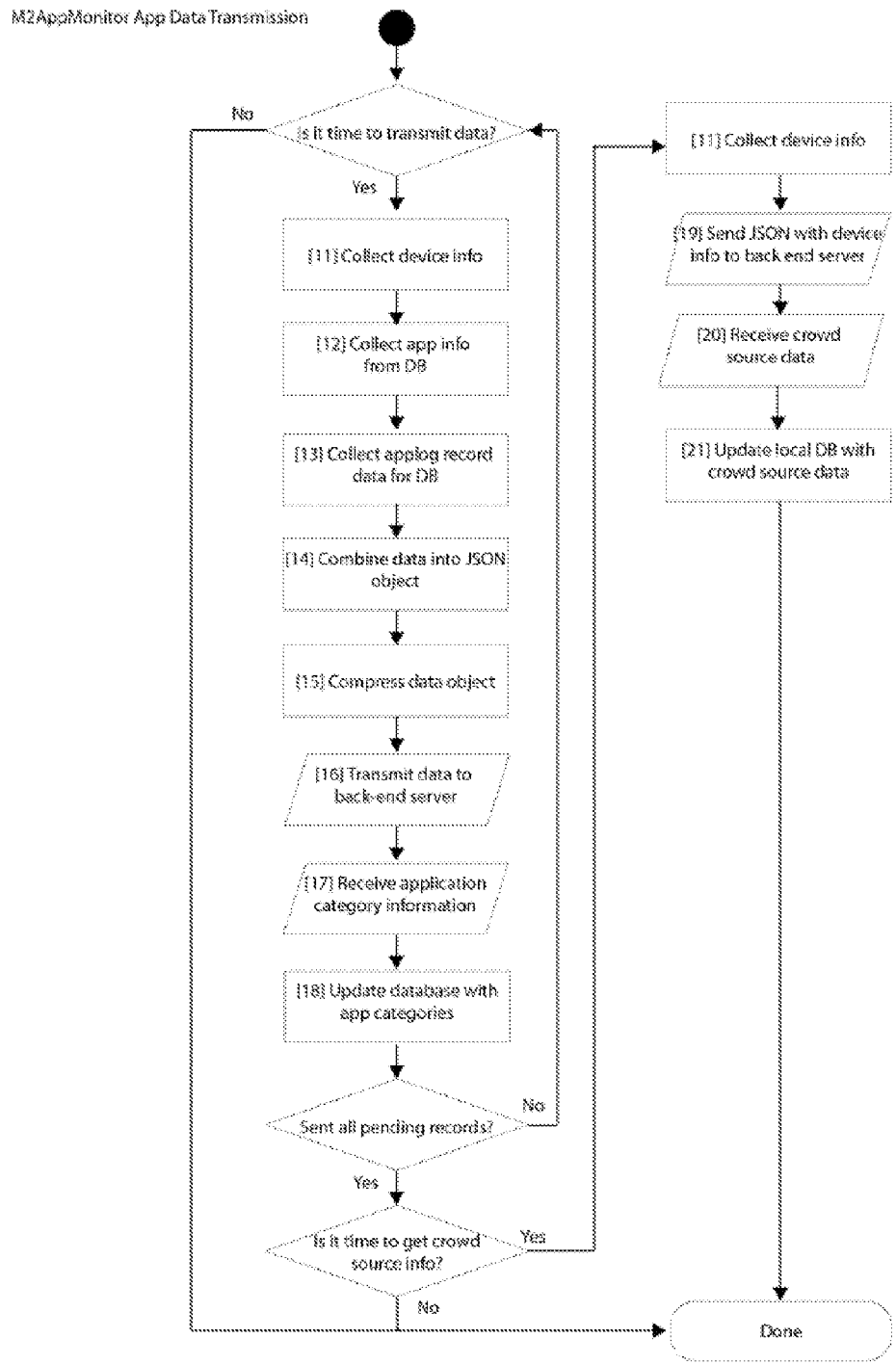
FIG. 13 is a flow diagram of the M2AppMonitor App Data Transmission.

FIG. 13 shows the method of transmitting the collected data to a back-end server. Step 11 is to collect device information. Step 12 is to collect app information from database. Step 13 is to collect app log record data from database. Step 14 is to combine data into JSON object. Step 15 is to compress data object. Step 16 is to transmit data to back-end server. Step 17 is to receive application category information. Step 18 is to update database with app categories. Step 19 is to send JSON with device info to back end server. Step 20 is to receive crowd source data. Step 21 is to update the local database with crowd source data.

Figure 14:
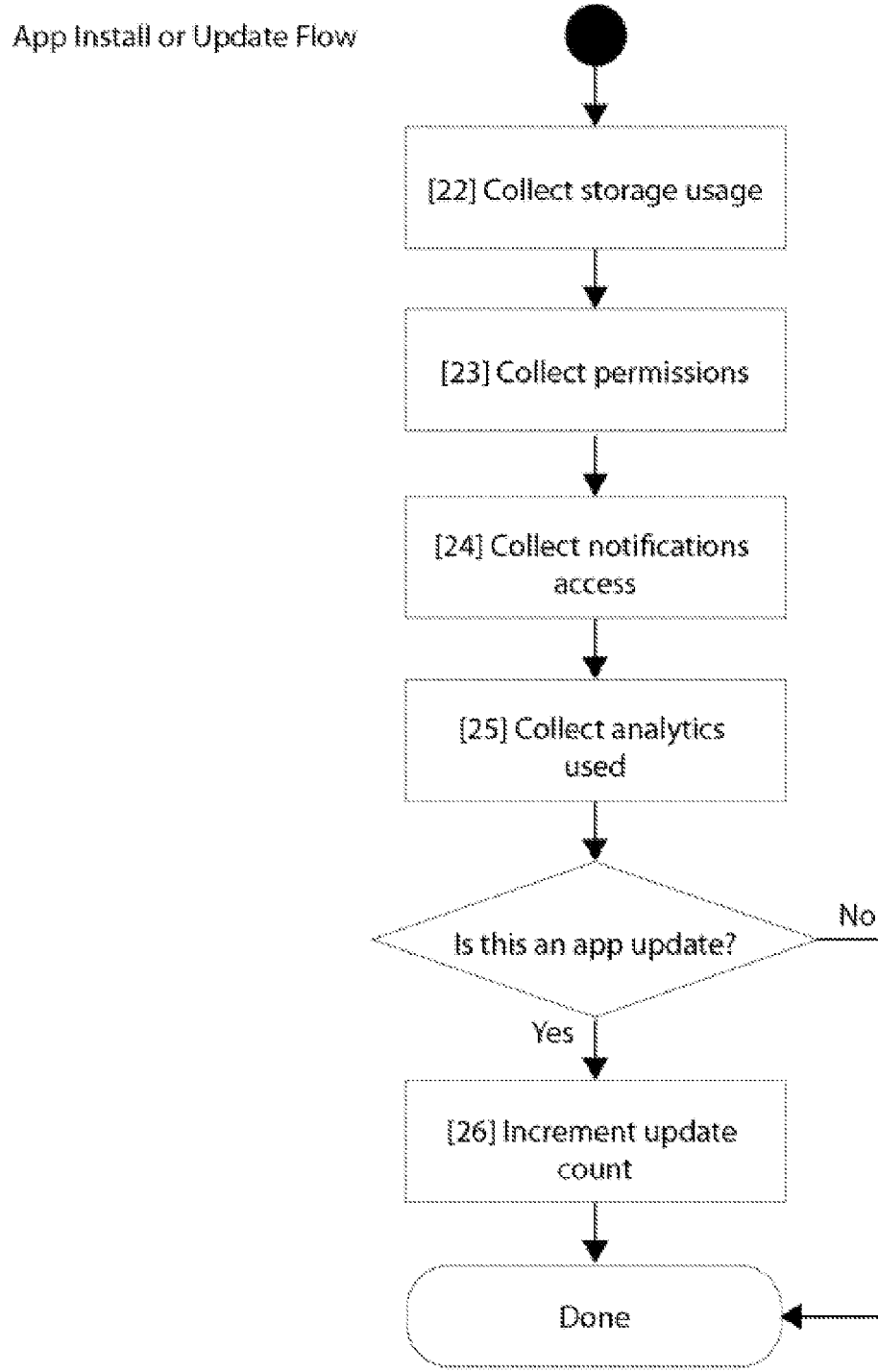
FIG. 14 is a flow diagram of the M2AppMonitor initial data collection for newly installed apps or upgraded apps.

FIG. 14 shows the method of adding new applications to M2AppMonitor. This occurs on initial install of M2AppMonitor, install of new applications on a device, or update of an existing app. Step 22 is to collect storage usage. Step 23 is to collect permissions. Step 24 is to collect notification access. Step 25 is to collect analytics used. Step 26 is to increment update count.

In a preferred embodiment a user may provide their profile and demographics. Based on the user profile and demographics the M2AppMonitor cloud based servers will recommend software apps based upon the user's profile and demographics. For example, age and sex are important for targeting specific markets such as video games for young males or contraception for young women. Based on crowd source information from other user's it will be possible to identify users that are likely to adopt or purchase suggested software apps for the users specific smart device.

For example, apps which are 5 star rated at an app store or android market are often propelled to the top of the app store recommended list by power users in the US and Europe who have high powered phones. In first world countries smart phones are most often subsidized by the carrier and they have top of the line CPU, Memory, Battery, Storage and antenna power which can be 10 fold superior to smartphones shipped in 3rd world countries. Also, many 3rd world countries are on 1X and 2G networks, let alone 3G and LTE 4G. Apps which perform great in the US and Europe on high powered phones and speedy carrier networks will often perform very poorly in other parts of the world. Thus, M2AppMonitor can matchup phones and networks that have the capacity to run certain apps based on the memory usage requirements and storage space required by the app.

M2AppMonitor can detect the device type and carrier network speed for the specific consumer and recommend apps which are appropriate for the device and network coverage. When you add the new concept of recommending apps based on demographics to the power of personalized app recommendations based on device type and carrier coverage, M2AppMonitor brings app recommendations to a new level.

Additionally, M2AppMonitor analyzes the apps on the user's mobile device and based on those apps alone or in conjunction with user profile and demographics can predict and suggest third party apps for the user. For example, M2AppMonitor will not recommend business apps to a consumer that only uses game apps. This is powerful for targeting app usage and adoption of new apps for users to increase mobile device efficiency.

Addition examples of important categories that assumptions can be based on are age, gender, education, marital status, union membership, union membership of others in household, business or employers' association membership, professional association membership, current employment status, main occupation, socio economic status, employment type—public or private, industrial sector, spouse: current employment status, spouse: occupation, spouse: socio economic status, spouse: employment type—public or private, spouse: industrial sector, household income, number in household, number in household under age 18, religious services attendance, religiosity, religious denomination, language usually spoken at home, region of residence, race, ethnicity, rural or urban residence and primary electoral district. Any combination of categories can be included in the M2AppMonitor.

M2AppMonitor Data Dictionary

| Raw Data Collected | |
|---|---|
| Device Specific - Updated daily | Log Data - Collected from active apps at 10 minute intervals |
| device uuid | entry date |
| device type id | device id |
| device type | device os |
| device os | log timestamp |
| home time zone | package name |
| device name | application version |
| carrier name | application version id |
| carrier id | battery usage |
| mcc | back battery usage |
| mnc | cpu usage |
| language | back cpu usage |
| latest post | memory usage |
| | data usage |
| | back data usage |
| | data wifi usage |
| | data mobile usage |
| | crash count |
| | run time |
| | front run time |

| Raw Data Collected | |
|---|---|
| Application Data - Aggregated on the device over time | |
| app name | average background battery usage rate |
| package name | average cpu usage rate |
| version name | average background cpu usage rate |
| application category | average memory usage |
| apk size | average data usage |
| data storage utilization | current crash count |
| cache storage utilization | total crash count |
| other storage utilization | persmissions |
| install date | analytic providers |
| last update date | total time run |
| average battery usage rate | update frequency |
| | last time used |
| Network Information | Wi-Fi Network Information |
| Cell Tower ID | Internal IP Address |
| Data signal strength | SSID |
| Phone signal strength | Wi-Fi Strength |
| Connection Type (2G, 3G, 4G, etc.) | Connection Speed |
| | 2 Ghz vs. 5 GHz connection |
| Device Information | Location Information |
| OS full version | Google Play Location |
| OS Build ID | Uses Network Location, Wi-Fi |
| Bootloader ID | location or GPS Location depending on conditions. |

Information Derived from Collected Data

| Application Tracking | App Metrics Tracked |
|---|---|
| Track app metrics by version number | Track Data - Mobile |
| Track app metrics by category | Track Data - Wi-Fi |
| Highest average data consumption | Track Data - Background |
| Most data used in the past month | Track Data - Total |
| Highest background data consumption rate | Track Data - Per week total |
| | Track Battery - Foreground |
| Most background data used in past month | Track Battery - Background |
| | Track Battery - Total |
| Top battery users (foreground) | Track Memory Usage |
| Top Battery users (background) | Track CPU - Foreground |
| Apps that use the most storage space | Track CPU - Background |
| Apps with the highest crash rate | Track CPU - Total |
| Apps with the most crashes | Track Storage Space - APK size |
| Apps with the least secure permissions | Track Storage Space - Data size |
| | Track Storage Space - Cache size |
| Apps with the most frequent updates | Track Storage Space - Other data size |
| Top memory users | |
| Top CPU users | Track Storage Space - Total size |
| Top overall resource users | Track Notification access - Install shortcut |
| Most used apps by run time | |
| Most used apps by onscreen time | Track Notification access - Send notifications |
| Longest average onscreen time | |
| Longest average run time | Track Notification access - Expand status bar |
| Top background battery users | |
| Time running (total) | Track Permissions - Flagged permissions |
| Time running (Foreground) | |
| Time running (Background) | Track Permissions - All Permissions |
| | Track Crashes |
| | Track Analytic Companies |
| | Track Updates - Per month |
| | Track Updates - Total |
| Dashboard Reporting | Device/User Information |
| Resource Notifications | Track data usage overall on device |
| Stability Notifications | |
| Access Notifications | Track top 5 data using apps on device |
| Number of active devices | |
| Number of registered devices | Track apps used on device |
| Number of dashboard users | Track phone use time |

-continued

| | |
|---|---|
| Number of active dashboard users | Track app usage history (Week or Month) |
| Number of active apps sending data | Track active device resource alerts |
| Number of registered apps | Track number of users of each device type |
| Number of data points collected overall | Aggregate comparative stats per device type |
| | Compare device functionality across carriers |
| | Carriers vs. Private Wi-Fi usage |

Additional information can be derived from the raw data which is collected. This raw data will be supplied weekly and can be used to determine additional app, manufacturer, device, user and/or carrier statistics.

Short Term Road Map Functionality Additions
1) Gather Additional Device Specific Information
a. Average Device Battery Drain Rate
b. Current Device Battery Drain Rate
c. Data Plan Limits & Plan Usage Amounts
d. Device Memory Usage Statistics
2) New Device Notifications
a. Battery Drain Rate Notifications—Notify if battery draining quickly
b. Data Plan Overages—Notify if user approaching data plan limits
c. Additional Resource Spike Notifications Additional modifications and improvements of the present invention may also be apparent to those skilled in the art. Thus, the particular combination of parts described and illustrated herein is intended to represent only one embodiment of the invention, and is not intended to serve as a limitation of alternative devices within the spirit and scope of the invention.

I claim:

1. A mobile device in combination with a CPU and memory for communicating with a software for identifying apps for the mobile device comprising collecting information about a user profile and user demographics, and detecting apps already on the mobile device, and categorizing the apps into at least one category, sending the information to a crowd sourced database where the software reads application resources selected from battery usage, wireless data usage, memory usage, CPU usage, and permissions and the crowd sourced database is compared to the application resource requirements so that the software can recommend an app in the same category using a proxy of application resource requirements of the 95$^{th}$ percentile or higher to identify a high resource requirement app already on the device, and a user is prompted to select an app with a lower application resource requirement for the category.

2. The software of claim 1 wherein the information additionally comprises one or more of: a mobile device model, a model device cpu, a mobile device memory, a wireless network carrier, a wireless network bandwidth, a WiFi signal coverage, an other network coverage, a BlueTooth®, a battery usage, a data usage, a memory usage, a CPU usage, and a storage space.

3. The software as in claim 1 wherein the mobile device receives crowd source data collected from other mobile device users to predict and suggest apps.

4. The software as in claim 1 wherein crowd-source based application recommendations and an information report will be fed back into the software.

5. The mobile device of claim 1, wherein the proxy of application resource requirements percentile is between 50-95.

6. A mobile device in combination with a CPU and memory with a method for identifying apps for a mobile device comprising collecting information about a user profile and user demographics, and detecting apps already on the mobile device, the software residing on a crowd sourced database, wherein the software reads application resources selected from battery usage, wireless data usage, memory usage, CPU usage, and permissions so that the software can categorize the apps and the software can recommend apps in the same category for a user having application resource requirements that are the same or greater than 95% of application resource requirements across applications in the same category.

7. The method of claim 6 wherein the information additionally comprises one or more of: mobile device model, model device cpu, mobile device memory, wireless network carrier, wireless network bandwidth, WiFi signal coverage, other network coverage, BlueTooth®, battery usage, data usage, memory usage, CPU usage, and storage space.

8. The method of claim 6 wherein the mobile device receives crowd source data collected from other mobile device users to predict and suggest apps.

9. The method of claim 6 wherein crowd-source based application recommendations and information reports will be fed back into the software.

10. The method of claim 6 wherein assessing the information for determining a crowd-source performance threshold for each app and providing a notification icon in a notification tray as a visual indicator that an app is performing above the threshold.

11. The method of claim 6 comprising a pathway for a user to download a suggested app.

12. The method of claim 6 wherein a carrier comprises software responsive to alert data from user.

13. The method of claim 6 comprising continually monitoring a plurality of apps while said mobile device is turned on.

14. The method of claim 6 wherein apps are recommended to users based upon said user's mobile device capabilities in terms of processing power and memory.

15. The method of claim 6 wherein apps are recommended to users based upon said user's mobile device capabilities in terms of WiFi coverage, BlueTooth coverage, and network coverage.

16. The method of claim 6 where in apps are recommended to users based upon a users' carrier network and its bandwidth capability.

* * * * *